No. 856,598. PATENTED JUNE 11, 1907.
I. E. McCRACKEN & E. S. WOODS.
STEEL TIRED WHEEL.
APPLICATION FILED FEB. 25, 1907.
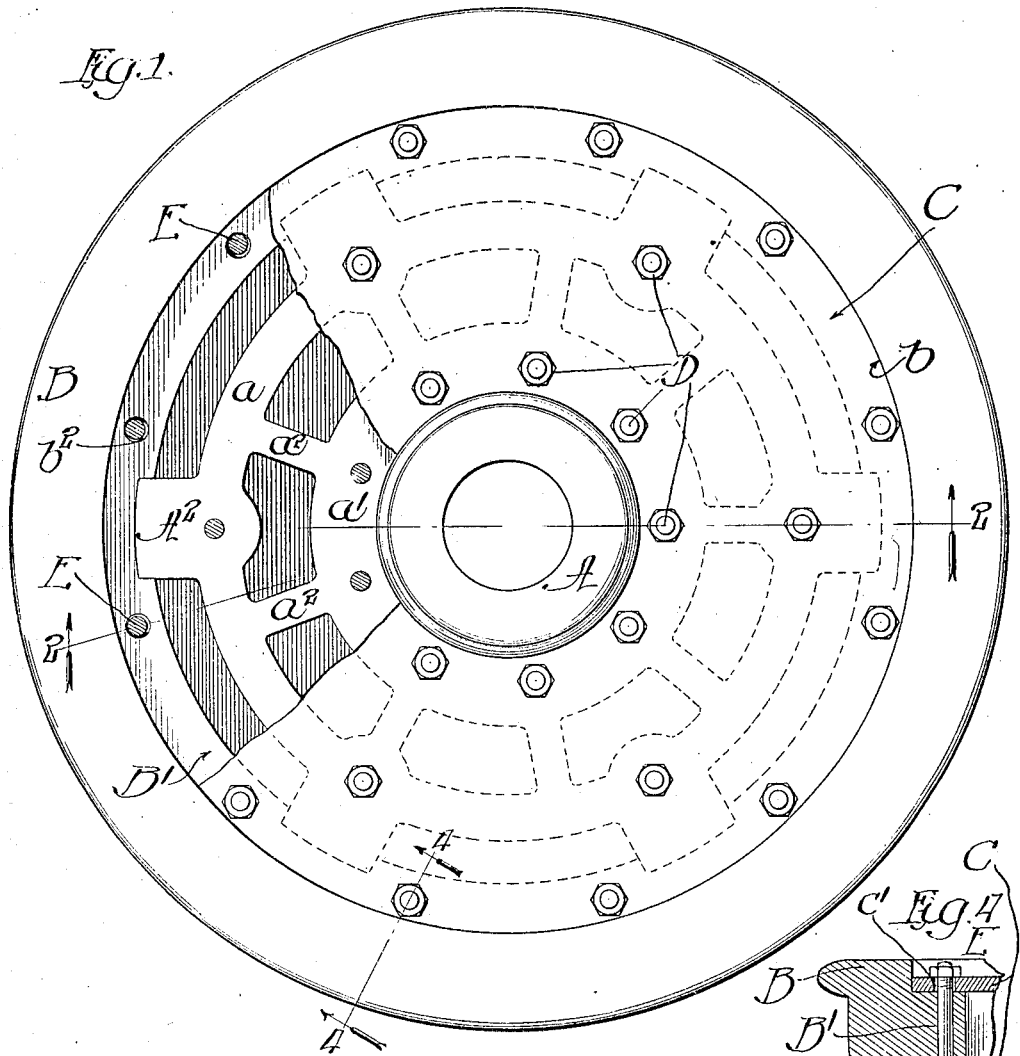
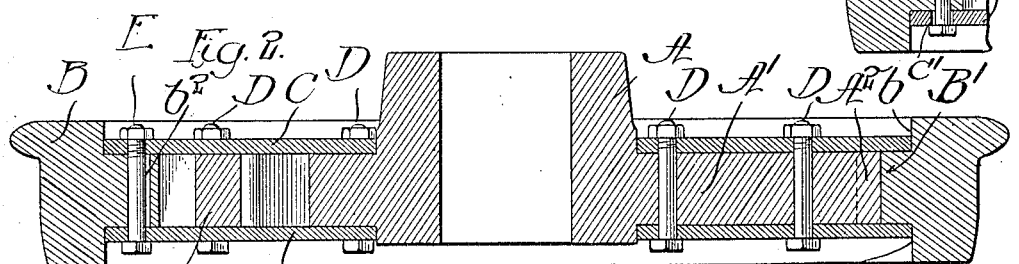
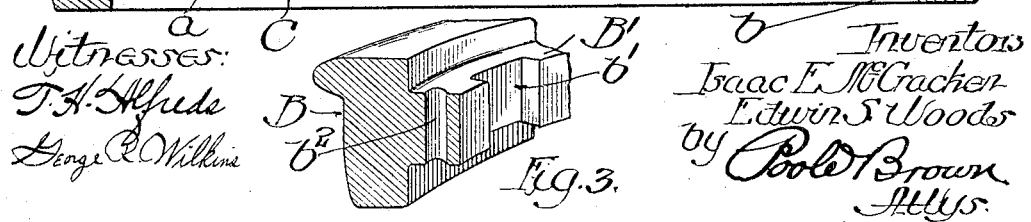

UNITED STATES PATENT OFFICE.

ISAAC E. McCRACKEN, OF WILKINSBURG, PENNSYLVANIA, AND EDWIN S. WOODS, OF CHICAGO, ILLINOIS, ASSIGNORS TO JOHN L. WOODS, OF CHICAGO, ILLINOIS.

STEEL-TIRED WHEEL.

No. 856,598.     Specification of Letters Patent.     Patented June 11, 1907.

Application filed February 25, 1907. Serial No. 359,263.

*To all whom it may concern:*

Be it known that we, ISAAC E. MCCRACKEN and EDWIN S. WOODS, citizens of the United States, and residents of Wilkinsburg, Allegheny county, Pennsylvania, and Chicago, Cook county, Illinois, respectively, have invented certain new and useful Improvements in Steel-Tired Wheels; and we do hereby declare that the following is a full, clear, and exact description thereof, reference being had to the accompanying drawings, and to the letters of reference marked thereon, which form a part of this specification.

This invention relates to improvements in steel tired wheels for railway cars and like uses, and the invention consists in the matters hereinafter set forth and more particularly pointed out in the appended claims.

Among the objects of our invention is to strengthen the connection between the tire and the inner frame or center of the wheel.

A further object of the invention is to provide an improved connection between the tire and the inner frame so arranged as to prevent the expansion of the tire, due to heat caused by the action of the brake-shoe thereon, from shearing the bolts connecting the tire with the inner frame.

In the drawings:—Figure 1 is a side elevation of a wheel embodying our invention, with parts broken away to show construction otherwise concealed. Fig. 2 is an axial section thereof. Fig. 3 is a fragmentary detail of the tire illustrating one of the features of our invention. Fig. 4 is a detail illustrating a modification, the section being indicated by the line 4—4 of Fig. 1.

As shown in the drawings, the wheel consists of an inner frame or center embracing a hub A and a spider $A^1$ which is herein shown as made integral with the hub, and a surrounding flanged, steel tire B rigidly attached to said inner frame or center. Said inner frame or center is of spider form, as herein shown, it comprising an inner and an outer ring-like portion $a$ and $a^1$ joined by radial connecting arms $a^2$. In the type of wheel herein shown the inner frame embraces as part of its construction plates C C attached to the cast portion of the inner frame by bolts D D and said plates constitute means for attaching the tire to the inner frame. To this end, said plates have overlapping engagement at their peripheral margins with the opposite faces of an annular, inwardly extending flange $B^1$ of the tire, and bolts E E extend through registering apertures in the overlapping parts of said plates and the annular flange B of the tire to fasten the tire to the inner frame. The plates are apertured to fit closely over the hub A of the wheel, and fit closely at their peripheries within annular rabbets $b$ $b$ formed between the flange $B^1$ and main body of the tire.

In accordance with our invention the tire, in addition to the attaching feature just mentioned, is further connected with the inner frame or center by means preventing relative rotation of said parts, thereby avoiding any tendency of a shearing action on the bolts E due to such relative rotation. This interlocking connection is afforded, as herein shown, by means of lugs $A^2$ $A^2$ which are made integral with and extend radially of the inner frame and enter notches $b^1$ formed on the inner face of the annular flange or rib $B^1$ of the tire. Said notches, as herein shown, open to both sides of said flange or rib, and the lugs $A^2$ fit with a close or driven fit in said notches.

The purpose of the construction described is to provide an interlocking connection between the inner frame or center and the tire, such as will absolutely avoid relative rotation of the tire and frame, thus producing not only a more rigid and reliable connection between the two parts of the wheel, but also relieving the bolts E which connect the tire with the inner frame of the shearing stress brought thereon, in the absence of the lugs, upon tendency of one of the parts to rotate relatively to the other. The construction shown and described permits the lugs $A^2$ to be made of ample width and as strong as is necessary to produce the required rigidity of connection between the parts.

In accordance with another feature of our invention, the bolts E by which the tire is attached to the inner frame or center are so related, in dimensions, to the bolt openings through which they pass as to permit the tire to expand or enlarge, when heated, without exerting stress on the said bolts tending to shear them. This result may be effected by designing the bolts to fit closely within the openings of the inner frame or center and loosely within the openings of the tire, or vice versa. As shown in Figs. 1 and 2, the said bolts E fit closely within the bolt openings of the plates C and extend through bolt openings $b^2$ of the rim or flange $B^1$ of the tire that are made of greater cross-sectional area than said bolts. In fitting the parts together and locating the bolt holes in this arrangement, said parts are so disposed that the bolts normally engage the sides of the bolt holes nearest the periphery of the tire. The bolts may be so arranged in the bolt holes $b^2$ as to themselves prevent relative rotation of the tire and the wheel center or frame, as shown, for instance, in the broken away portion of Fig. 2. That is to say, each alternate two bolts E for this purpose may engage the sides of the bolt holes through which they pass remote from each other, circumferentially of the wheel. This arrangement of the bolts is especially useful in the absence of the interlocking connection between the tire and inner frame just described. As shown in Fig. 4 the bolts E fit closely within the bolt holes of the tire, but fit loosely within the bolt holes $c^1$ of the plates C of the inner frame. In this construction the shanks of the bolts normally engage the radially inner sides of said bolt holes.

The purpose of the construction and arrangement just described is to permit the expansion of the tire, due to the action of the brake-shoe thereon, without bringing a shearing stress upon the attaching bolt E. It is well known that the braking action of the shoe on the tire highly heats the tire, and produces a substantial enlargement or expansion thereof. In wheels of this construction heretofore made, wherein the attaching bolts fit tightly in the bolt openings of the tire and inner frame through which they pass, such expansion has a tendency to produce an enormous shearing action on said bolts with the result of destroying their integrity and making it necessary to replace said bolts.

It is to be understood that our invention is capable of general adaptation to wheels of the general construction herein shown, embracing an inner frame or center and a separate tire attached thereto by bolts or analogous fastening devices, and we do not wish to be limited to the construction herein illustrated, except as hereinafter made the subject of specific claims.

We claim as our invention:—

1. A wheel comprising an inner frame and a tire, interlocking parts on said frame and tire preventing relative rotation thereof, and means not piercing the frame and tire at said interlocking parts for fastening the tire to the inner frame.

2. A wheel comprising an inner frame and a tire, lugs on one of said parts which fit in interlocking connection with notches in the other part to prevent relative rotation thereof, and means not piercing said lugs for fastening the tire to the inner frame.

3. A wheel comprising an inner frame and tire, said frame having a part which fits in overlapping engagement with the tire, interlocking connections between the frame and tire preventing relative rotation thereof, and means located intermediate said interlocking connections for fastening said tire to the inner frame.

4. A wheel comprising an inner frame and tire, said frame having a part which fits in overlapping engagement with the tire, said tire being provided with a plurality of radial notches, lugs on the frame engaging said notches, and bolts extending through apertures in said overlapping parts intermediate said interlocking lugs and notches.

5. A wheel comprising an inner frame and tire, plates attached to the sides of the frame and overlapping the tire at their peripheral margins, bolts extending through openings in the overlapping parts of the plates and tire, and interlocking connections between the frame and tire acting to prevent relative rotation of the parts.

6. A wheel comprising an inner frame and a surrounding tire, plates attached to the sides of said frame and overlapping the tire at their peripheral margins, bolts extending through openings in the overlapping parts of said plates and tire, said tire being provided with a plurality of radial notches, and lugs on the frame engaging said notches.

7. A wheel comprising an inner frame and a tire, said frame having overlapping engagement with the tire, and bolts extending through openings in said overlapping parts, the bolt openings in one of said parts being of larger cross-sectional area than the bolts, said bolts being so disposed relatively to the margins of said openings, radially of the wheel, as to permit expansion of the tire without exerting shearing stress on the bolts.

8. A wheel comprising an inner frame and a tire, said frame having overlapping engagement with the tire, and bolts extending through openings in said overlapping parts, the bolt openings in one of said parts being of larger cross-sectional area than the bolts, and said bolts being so arranged, relatively to each other and to the sides of the bolt openings circumferentially of the wheel, as to prevent relative rotation of the tire to the frame.

9. A wheel comprising an inner frame and a tire, plates attached to the sides of said frame and overlapping at their peripheral margins said tire, bolts extending through openings in said overlapping parts, the bolt openings in one of said parts, to wit,—the plates or the tire, being made of larger cross-sectional area than the bolts, said bolts being so disposed relatively to the margins of said openings, radially of the wheel, as to permit expansion of the tire without exerting shearing stress on the bolts.

10. A wheel comprising an inner frame and a tire, said frame having overlapping engagement with the tire, bolts extending through openings in said overlapping parts, the bolt openings in one of said parts being of larger cross-sectional area than the bolts, and parts on said frame having interlocking engagement with said tire to prevent relative rotation thereof.

In testimony, that we claim the foregoing as our invention, we affix our signatures in the presence of two witnesses, the said McCRACKEN, at Wilkinsburg, Allegheny county, Pennsylvania, this fifth day of February, A. D. 1907, and the said WOODS, at Chicago, Cook county, Illinois, this 20th day of February, A. D. 1907.

ISAAC E. McCRACKEN.
  EDWIN S. WOODS.

Witnesses to the signature of Isaac E. McCracken:
 THOMAS DAVIS,
 JOHN J. GALLAGHER.

Witnesses to the signature of Edwin S. Woods:
 W. L. HALL,
 GEORGE R. WILKINS.